(No Model.) 6 Sheets—Sheet 1.

W. P. HOSKINS.
SHIP'S BERTH.

No. 544,980. Patented Aug. 20, 1895.

WITNESSES
Henry Ckerrett
Arthur F. Sadler

INVENTOR
William Parish Hoskins
By Connolly Bros Attys (No Model.) 6 Sheets—Sheet 2.

W. P. HOSKINS.
SHIP'S BERTH.

No. 544,980. Patented Aug. 20, 1895.

WITNESSES
Henry Cherrell
Arthur J. Sadler

INVENTOR
William Parish Hoskins
By Connolly Bros Attys (No Model.)
W. P. HOSKINS.
SHIP'S BERTH.
No. 544,980. Patented Aug. 20, 1895.
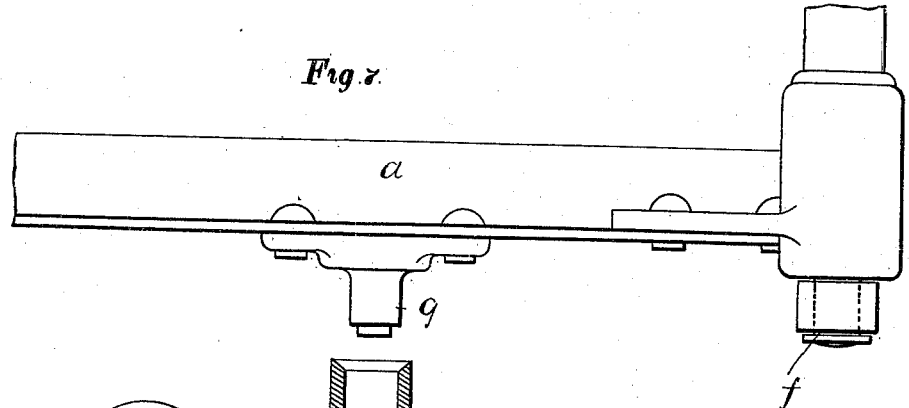
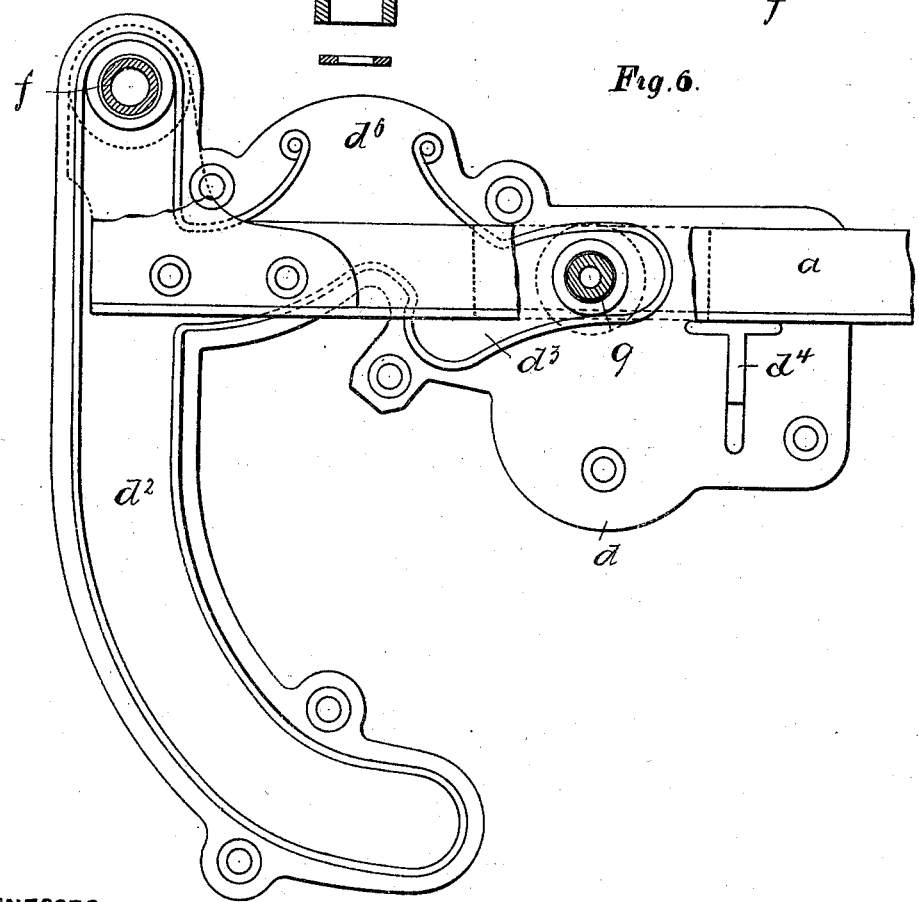
WITNESSES
Henry Cherrett
Arthur T. Sadler
INVENTOR
William Parish Hoskins
By Connolly Bros Attys (No Model.) 6 Sheets—Sheet 4.
W. P. HOSKINS.
SHIP'S BERTH.

No. 544,980. Patented Aug. 20, 1895.

WITNESSES
INVENTOR

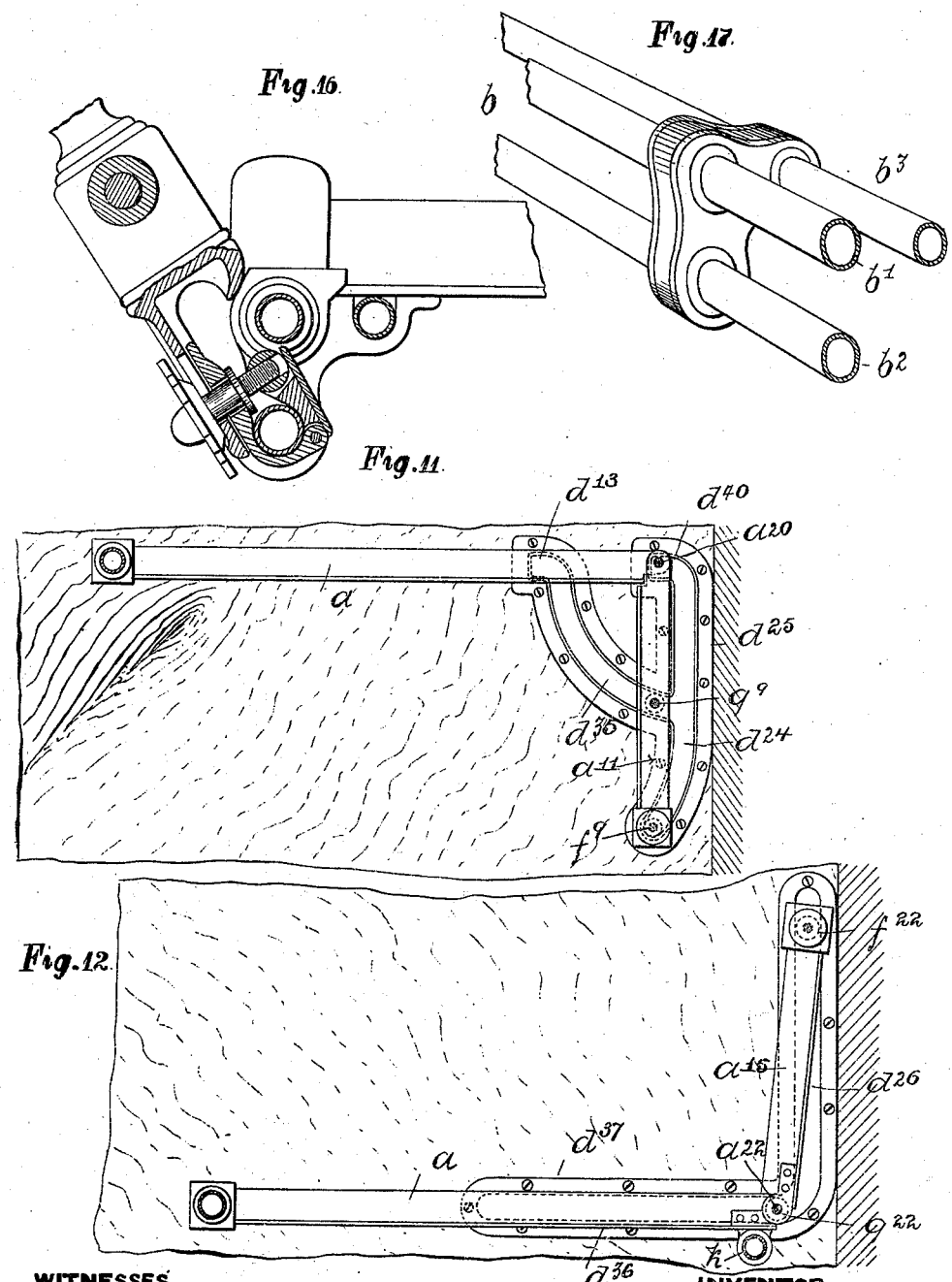

(No Model.) 6 Sheets—Sheet 6.
W. P. HOSKINS.
SHIP'S BERTH.
No. 544,980. Patented Aug. 20, 1895.
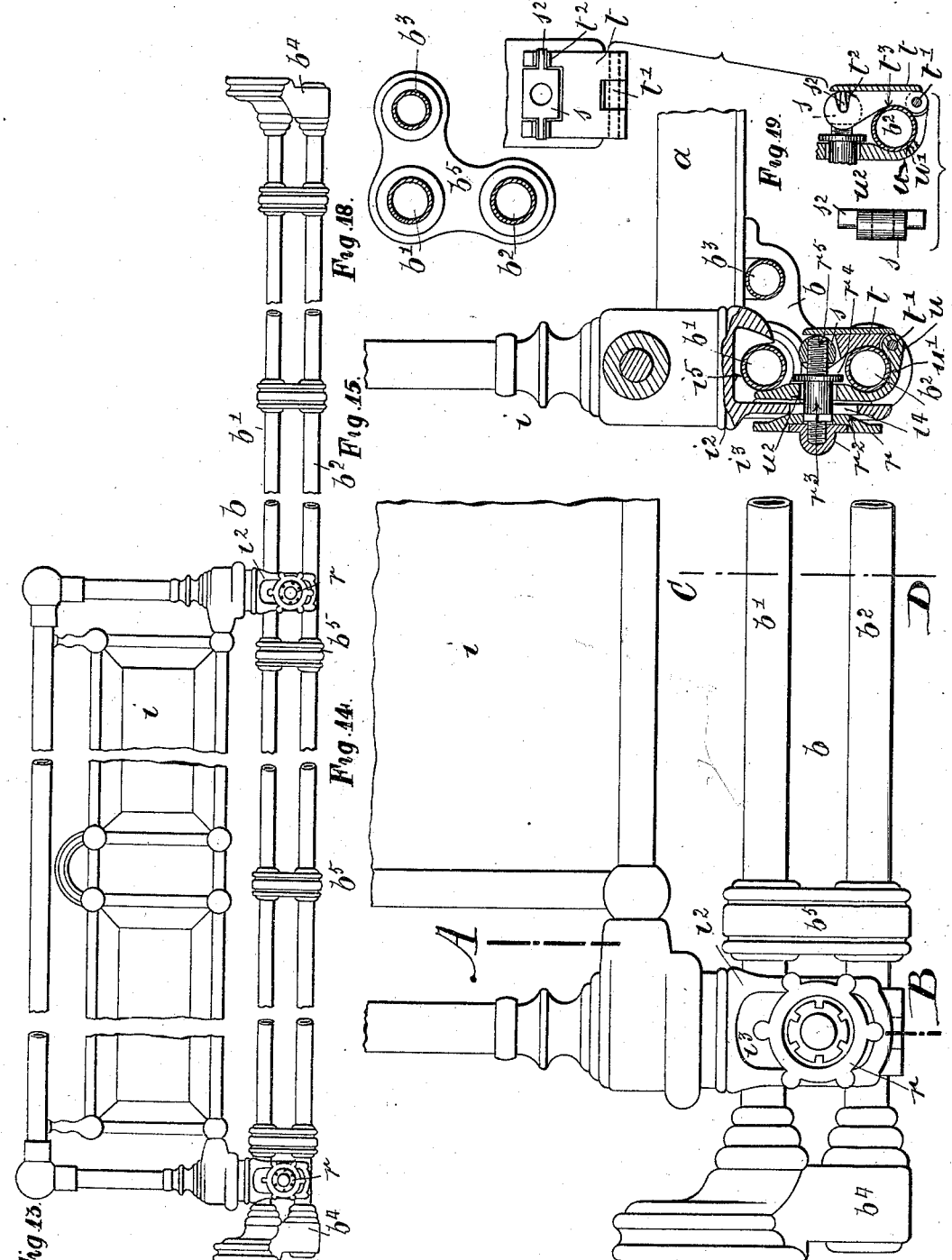
WITNESSES
INVENTOR
William Parish Hoskins
By Connolly Bros Attys

UNITED STATES PATENT OFFICE.

WILLIAM PARISH HOSKINS, OF BIRMINGHAM, ENGLAND.

SHIP'S BERTH.

SPECIFICATION forming part of Letters Patent No. 544,930, dated August 20, 1895.

Application filed December 6, 1892. Serial No. 454,297. (No model.) Patented in England July 13, 1887, No. 9,827, October 28, 1889, No. 16,967, and August 1, 1891, No. 13,098.

*To all whom it may concern:*

Be it known that I, WILLIAM PARISH HOSKINS, berth manufacturer, a subject of the Queen of Great Britain, residing at Upper Trinity Street, Bordesley, in the city of Birmingham, England, have invented certain new and useful Improvements in Berths; and I do hereby declare the following to be a full, clear, and exact description of the invention, reference being had to the accompanying drawings, which form part of this specification, and for which invention Letters Patent of Great Britain have been granted, bearing date July 13, 1887, No. 9,827, October 28, 1889, No. 16,967, and August 1, 1891, No. 13,098.

This invention relates to sleeping-berths—such, for example, as are employed on board a ship or ships' cabins, night-traveling railway-carriages, barracks, prisons, temporary structures, and the like—and has for its object the provision of novel means whereby the berths may be folded or turned up against the wall or side of the cabin, car, or other structure in which the berths are located.

This invention consists in the novel construction, combination, and arrangement of parts, as hereinafter described and claimed.

In the accompanying drawings, Figure 1 is a perspective view of a berth embodying my invention. Fig. 2 is a side view of one of the bracket-carriers which support the berth, with the berth partly shown in horizontal or open position. Fig. 3 represents a like view as Fig. 2, but with the berth-frame folded and with the dual and shifting pivot-centers resting at the lower ends of their respective slots or races. Fig. 4 represents, partly in plan and partly in horizontal section, the two ends and part framing of my ship's berth, Fig. 1, but without the lee-rail fitting. Fig. 5 is a side view of the inner end of a berth-frame of a modified construction. Fig. 6 is a side view of the structure shown in Fig. 5 with berth-frame unfolded. Fig. 7 is a plan view of the same with one of the antifriction-rollers detached. Figs. 8, 9, 10, 11, and 12 are side views of further modifications of the berth-frame. Fig. 13 is a view of the lee rails. Fig. 14 is an enlarged view of a portion of the lee rail. Fig. 15 is a transverse vertical section on the dotted lines A B of Fig. 14. Fig. 16 is a like view with parts of the securing and locking devices dislocated. Fig. 17 is a perspective view of the triple members of the front framing of the berth. Fig. 18 is a cross-section on the dotted line C C of Fig. 14. Fig. 19 is a sectional view of the locking device.

The same letters of reference indicate corresponding parts.

$a\ a$ are end bars or angle-bars of the berth-framing. $b$ is the front bar of the said framing, and $c$ is the back or inner elevated bar of the framing.

$d$ are carrier-brackets secured to the partition-walls or bulk-heads $e$ of a ship's cabin or berth, by screws or otherwise, passed through holes made in web or flanged parts of the said bracket-carriers.

The inner ends of the opposite parts $a$ of the framing have pivot or rollered centers $f$ $g$, which respectively work within quadrant and combined quadrant and straight slots $d^2$ $d^3$—that is, the outer and elevated pivot-centers $f$ work within a combined quadrant and upright slot or race $d^2$, with a stop $d'$ at its upper end, against which the upper part $c^2$ of the erect part $c'$ takes its bearing when the berth is horizontal or unfolded, as in Figs. 2 and 4. The other and inwardly-directed pivot-centers $g$ work within the quadrant or slots or races $d^3$, and when the berth is folded the said centers $g$ rest, like those of $f$, against the lower ends of the slots.

The pivot-centers may be provided with antifriction-rollers $f'$ $g'$, so that the said pivots shall freely traverse the slots.

On the berth requiring to be folded, or the position changed from that of Fig. 2 to that of Fig. 3, the outer side $b$ is taken hold of and raised, when the inner end of the berth-frame moves slightly forward and then partakes of a rear action by the pivot sliding or moving down the races to the positions as in Fig. 3, and by which rear action the berth-frame is partly balanced or counterpoised. It will be also seen that the berth-frame is made to rest folded in a state of equilibrium by the inclined position taken by the end bars of the framing and by the other pivot-centers passing to the lower ends of the inwardly-described arc portions of the slots or races $d^2$.

To unfold the berth, pull downwardly the fore part of the framing, when the shifting pivot-centers traverse the respective slots and the berth assumes the position, as represented in Fig. 2, with the under side of the berth-frame resting upon the block-support $d^4$, which thereby transfers the strain from the inner pivots to the carrier-brackets.

Fig. 5 represents a modification of the preceding arrangements, and is designed for the purpose of facilitating the introduction of the pivot-centers into their respective slots or races. The said Fig. 5 represents the inner end of the berth-frame or the pivot-centers thereof being placed within the said slots or races.

Fig. 6 represents the berth-frame in position unfolded, and Fig. 7 is a plan of the same, showing one of the antifriction-rollers removed from its pivot-center and in section. $a$ are the end framings of a ship's berth and $f$ and $g$ are the pivot-centers, disposed at the two opposite inner ends of the said framings $a$, and which pivot-centers work within races or slots $d^2 d^3$, access to which is gained through the gate or opening $d^6$, wherethrough the said pivot-centers pass. The berth-framing is supported in position when unfolded by a rest $d^4$, carried by the carrier-bracket framing $d$.

Fig. 8 represents a further modification of my invention, in which the slots or races are carried by the inner end of the berth-frame, and the pivot-centers, as aforesaid, are carried by the carrier-brackets, secured to the bulkhead, cabin walls, or other uprights of a ship. The berth has a rear action in folding and becomes partly counterpoised, as in the former arrangements. It will be seen that in this particular form of my invention the slots or races are made to run over or traverse studs which pass through the slots. The said Fig. 8 represents in side elevation one end of the inner end of a berth-frame when the berth-frame is in a horizontal position or unfolded. $a$ is an end framing bar or member of a berth-framing, and $a^2$ is an enlarged inner end with slots $d^{20} d^{30}$, wherethrough fixed studs $f^2 g^2$ of a stationary carrier-bracket $d^5$ pass. The slot or race $d^{20}$ runs through a portion of its length in the direction of the berth-framing and with the rear portion carried downwardly or inwardly into an arc and terminating in the same axial plane as the plane and straight slot $d^{30}$. Thus, on the fore part of the berth-frame being raised the rear or inner part dips downward, and with the arc part of the slots $d^{20} d^{30}$ moving over the stud or fulcrum $f^2$ and on the straight parts of the slots or races becoming vertical, or nearly so, the berth-frame falls rearwardly until the studs, as aforesaid, come against the inner ends $a^5 a^6$ of the slots $d^{20} d^{30}$, respectively, and rest in the said position, with the bedding of the berth between its inner side and the back-supporting framing. To unfold the berth it is only necessary to pull forward the front of the berth-frame, then slightly raise it, when the slots or races move over the studs or centers and with the under side of the framing resting upon a stop $d^4$, which may be placed in any suitable position with respect to the under side of the berth-frame, with the ends $a^7 a^8$ of the slots resting against the studs $f^2 g^2$.

Fig. 9 is another modification of the preceding arrangements. In this arrangement the stud is carried near the two opposite inner ends of the opposite end framings. $a$ is one of the end framing-bars of the berth-frame. $c^{11}$ are inner side pillars, upon the upper end of which is an antifriction-roller $f^{11}$, which works or traverses against the flanged upright $d^{21}$. A carrier-bracket $d^{22}$ is provided, with a snail-shaped slot or race $d^{31}$, wherein the fixed roller-stud $g g'$, carried by the berth-framing, works, so that, on the berth-framing being tilted for folding, the stud $g'$ traverses the slot $d^{31}$ until the studs reach the inner ends $d^{14}$ of the said slots or races, and in which position the berth-frame is in a state of equilibrium, with the rear part depending below the general plane of the berth-frame when in use.

Fig. 10 represents a further modification, in which the studs are carried by the carrier-brackets and work within straight slots or races, directed in planes perfectly parallel to the berth-framing and with the rear part of said framing provided with antifriction-rollers, which roll upon and traverse vertical upright guides. $a$ are the two opposite end bars of the berth-framing. $f^{10} f^{11}$ are roller-pivots at the inner end, and $d^{32}$ are straight grooves or races disposed at a lower plane than the rollers $f^{10} f^{11}$, and within which said grooves or races are fixed studs $g g'$, carried by carrier-brackets $d^{23}$. When the berth is required to be folded, the fore part of the framing is tilted or raised, when the slots or races $d^{32}$ pass over the roller-pivots $g g'$, and at the same time the rear end of the berth-frame makes a rear action and causes the roller $f^{11}$ to traverse or roll down the upright guide $d^{21}$. When the berth-frame is in use, its under side rests upon a fixed stop $d^4$, placed in any required position on the under side of the berth-framing.

Fig. 11 represents my invention applied to a distensible fold-up berth, and with the same in a contracted position to be used by a single person or for a narrow berth. $a$ is the fore part of the framing, jointed at $a^{20}$ to a rear part $a^{11}$, fitted with side-located roller-joints $f^9 g^9$. The pivot $f^9$ works within the race $d^{24}$ of the bracket $d^{25}$, while the pivot $g^9$ works in the race $d^{35}$ of the said bracket. The upper part of the race $d^{24}$ has a pocket end $d^{40}$, wherein the pivoted roller $f^9$ rests when the framing is completely distended. To increase the size of the berth from that of Fig. 11 pull the framing part $a$ forward, when the compound framings $a a^{11}$ will straighten out at the joint $a^{20}$ and the roller $f^9$ will run up the race $d^{24}$ and the roller $g^9$ up the race $d^{35}$, until the side rollers rest within the pocket ends $d^{13}$ $d^{40}$ of the said races.

Fig. 12 represents a modification of Fig. 11. $a$ $a^{15}$ is the compound framing jointed at $a^{22}$, which is provided at the said joint with a roller $g^{22}$, while the extreme inner end of the section part $a^{15}$ has a roller-pivot $f^{22}$, which roller-pivot and roller work within channels or races $d^{26}$ $d^{36}$ of fixed framing $d^{37}$, secured to the bulk-head or internal fitting of a ship. To stay the sections of the framings at the joint parts, a cross-stay $k$ is employed.

It will be understood that the foregoing representations, other than Figs. 1 and 4, are only the brackets and inner-end parts of one side of a berth-frame, but which are used at both ends of the said framing.

Fig. 13 represents the berth lee rail and front framing constructed according to my invention. In this arrangement the lower terminal branches of the lee rail turn upon the lower member of a triple-member berth-framing, and which said lee rail framing is locked or secured to the two front members, or those members lying one under the other and in parallel order, by affixing and securing devices carried by the said lee-rail lower extremities.

Fig. 14 represents a lower corner portion of the said lee rail and the corresponding end of the triple-membered framing, showing more clearly the disposition of the parts and the means for securing and locking the movable framing parts.

Fig. 15 represents a transverse section upon the dotted lines A B, Fig. 14, and with the parts in the positions which they normally assume when the lee-rail framing is in use and in an erect position.

Fig. 16 represents a like section as Fig. 15, but with the parts of the securing and locking devices dislocated or let loose by the turning of the operating-screw, and with the lower extremities of the lee rail turned upon the lower member of the triple framing and from off and clear of the front top member of the triple front framing.

Fig. 17 is a perspective view of the triple members with respect to each other, and how the same are united together as one framing by a chill-casting or chill-connection bracket.

Fig. 18 is a cross-section upon the dotted lines C D.

Figure 1:
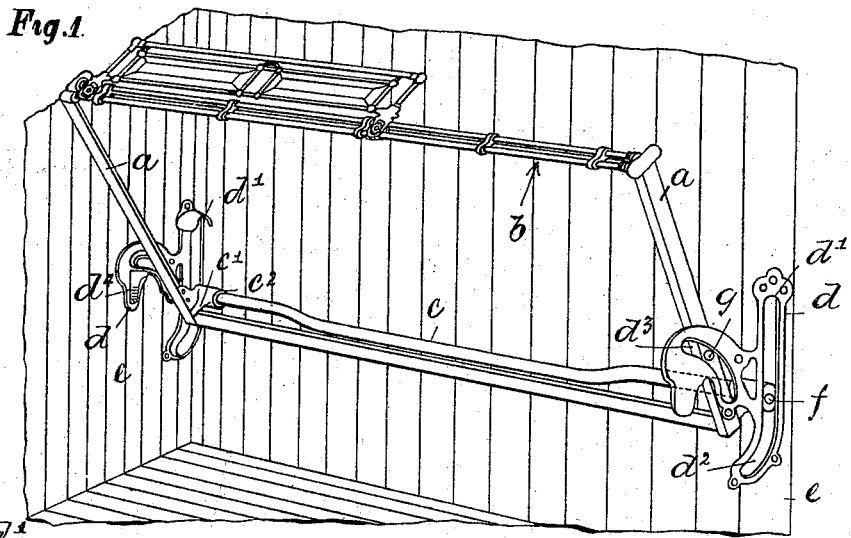
Figures 2, 3:
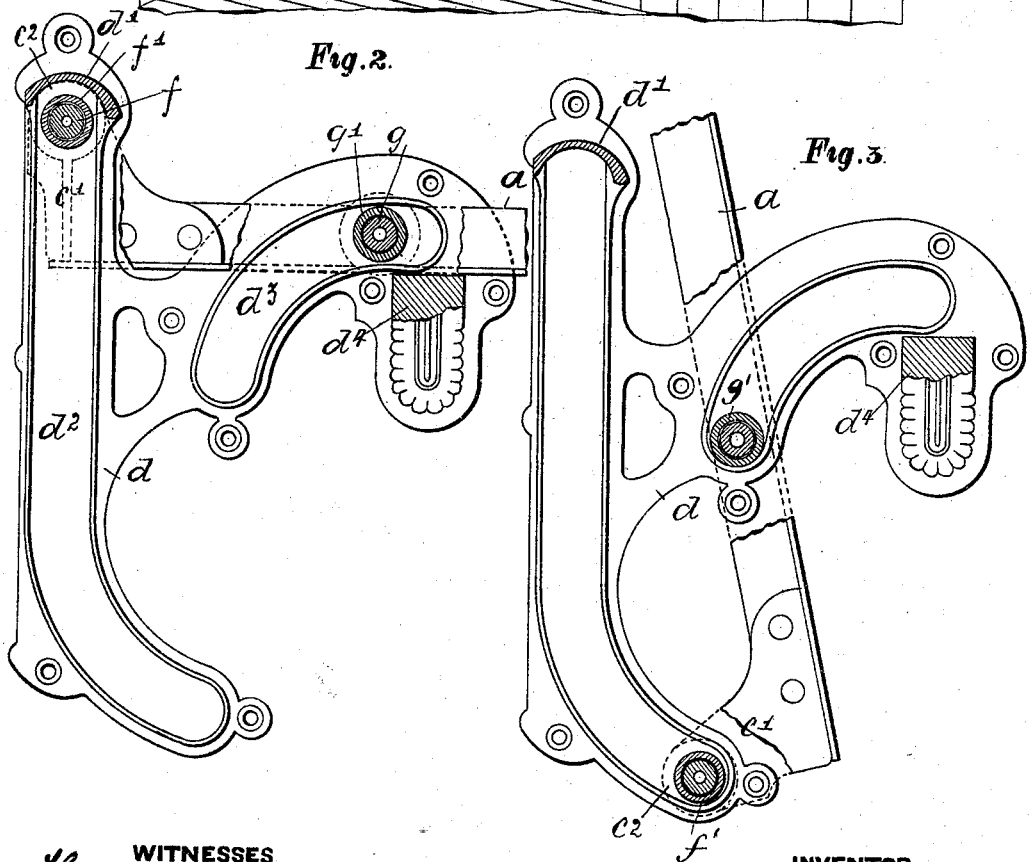
Figure 4:
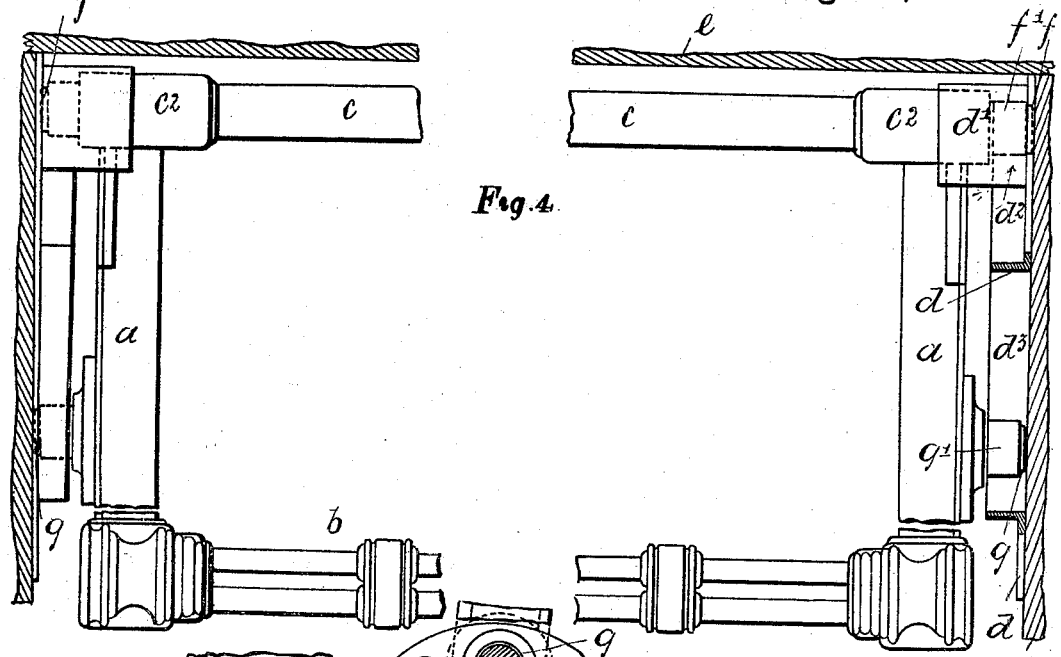
Figure 5:
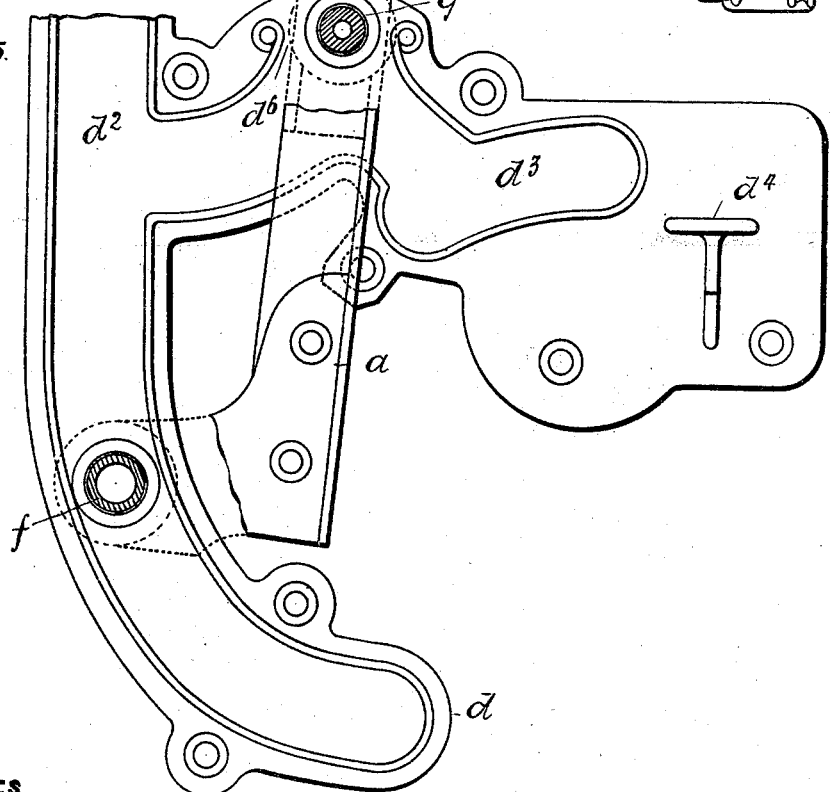
Figure 8:
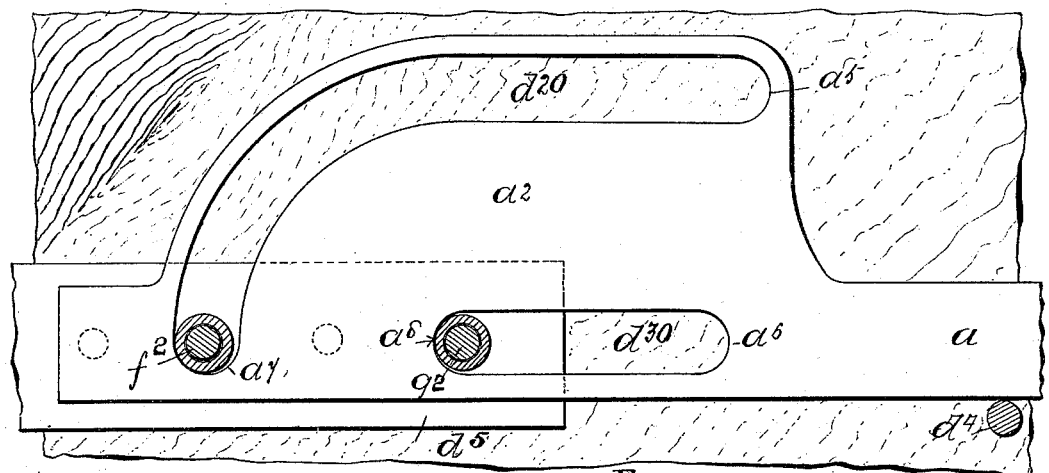
Figure 9:
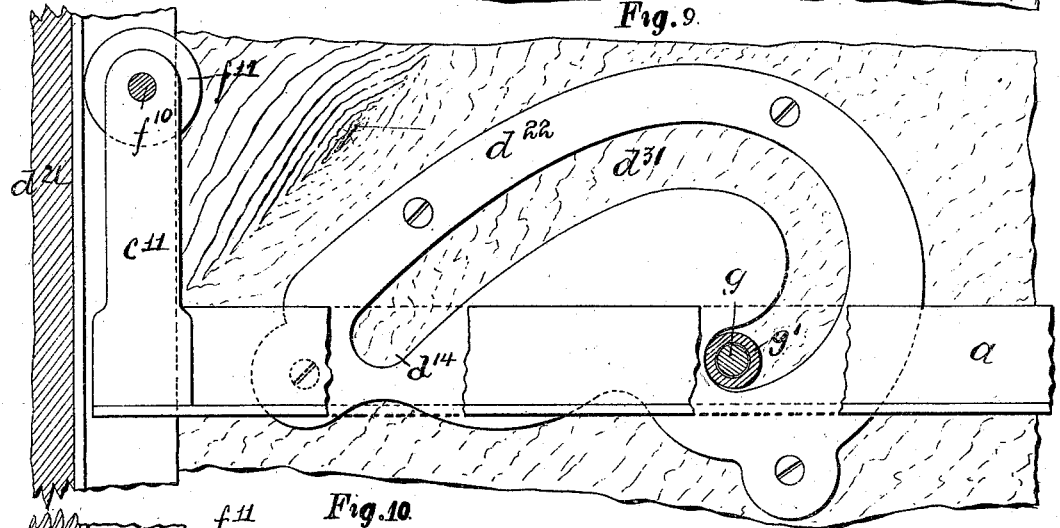
Figure 10:
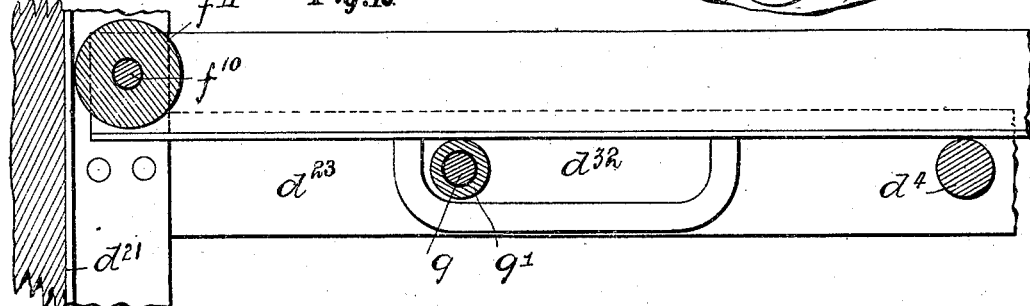

Fig. 19 represents the locking-device part of the affixing means. $b'$ $b^2$ $b^3$ are triple members of the front frame $b$, united together by middle and end union castings or chills $b^4$ $b^5$, which constitute, when combined, an open triplet framing, disposed alike unto the members or webs of an angle framing. The organization of the said framing produces a front or other frame, side, or part of a berth, having great strength combined with lightness. Besides the above-named properties the said framing, by its skeleton constitution, has a light and more graceful appearance than single-thick railings or rods or flat angle-bars.

$i$ is a lee rail, with lower extremities $i^2$, attachedly connected to the said front framing by affixing and locking devices, comprising, of the one part, a front cheek or face plate $i^3$, having an upright long piercing $i^4$, directed partially up its middle, and a crown or semi-circular seat $i^5$, taking upon the top front member of the said triplet framing. Passing through the slot $i^4$ of the said depending part $i^3$ is a capstan-headed screw-pin $r$, with a coned facet $r^2$, shank $r^3$, and an attached collar $r^4$, and with the said shank terminated by a screwed end $r^5$, which takes within or through a trunnion-ended screw-box $s$, capable of making an angular motion about the said trunnion ends $s^2$, as centers, within hooked-shaped bearings or recesses $t^2$ of a back and jointed member $t$, which is jointed to a front member $u$ at its lower end $t'$. The lower parts of the said jointed members $t$ $u$, which constitute an adjustable clip, have seatings $t^3$ $u'$, respectively adapted to embrace and partially encircle the lower member $b^2$ of the triplet framing, and about which said lower member, when the parts are dislocated, the lee-rail and its parts are capable of rotating as a center. The plate or cheek part $i^3$ is capable of a sliding motion upon the face of the jointed member $u$, which has a hole $u^2$ through it, wherethrough the shank $r^3$ of the capstan-headed pin $r$ passes, so that the said part $i^3$, by its slot $i^4$, is capable of rising and bringing forward or over the seat $i^5$, clear of the rod member $b'$ of the triple framing. Thus, assuming the rail requires to be turned down or folded and the connecting and fastening parts to be in the positions which they assume in Fig. 19, then rotate the screw-pin $r$ from right to left, when the stem end $r^5$ is rotated partially out of the screw-box, when the whole of the parts of the clips comprised by the members $t$ and $u$ are dislocated and the pressure of their seats $t^3$ $u'$ upon the frame member $b'$ of the triplet framing is relaxed. The parts are now being disorganized. The disconnection of the upper part of the portion $i'$ with the top-rod member $b^3$ is performed by sliding upwardly the lee rail, when the seat $i^5$ is taken from off the rod member $b'$, and with the parts at rear of it clear of the top of the same, when the said lee-rail admits of turning or folding down, as represented in Fig. 16. The reverse action for locking and affixing is performed by first lifting the lee rail, then bringing the same erect with the seat above the rod member $b'$, when, by the letting go of the said lee rail, the parts take their affixing positions, as in Fig. 15, when, by the turning of the head of the screw-pin, the dislocated parts are drawn together and the same locked by the clamping of the members $t$ and $u$ around the rod member $b^2$, whereby the other embracing parts are prevented from moving.

By employing triplet or like framings, as described, in connection with ship's berths, no end pillars or upright castings are employed in the affixing of the lee rail in its erect position, as the same stands unsupported.

Instead of employing three rods, as described, four or other number may be employed, arranged after the manner of a square, grating-wise, or following each other vertically or horizontally, and with the whole carried from end chills or corners.

Having described my invention, what I desire to claim and secure by Letters Patent, is—

1. A folding berth having double pivots in combination with stationary carrier brackets having double channels, grooves or slots, in which said pivots move, substantially as described.

2. In a folding berth, the combination with the berth, having double movable pivots on each side of stationary supporting brackets having double communicating slots in which said pivots move, one of said races or slots having a gate or opening $d^6$, substantially as described.

3. In folding berths, the combination with a dual pivot frame, and dual slotted brackets, of a fixed stop upon which the berth rests when lowered, substantially as described.

4. In folding berths, the combination with the berth of a shifting fulcra support comprising double pivot or roller bearings working in slotted plates, substantially as described.

5. In a berth, the combination of two sections hinged together, the inner section being supported upon double movable pivots with stationary brackets having races or channels in which said pivots work, substantially as described.

6. In folding berths, the combination with a jointed frame and dual pivots on the inner section of stationary brackets, having dual races or channels, substantially as described.

7. In berth framings, the lee-rails in combination with multiple-membered sides, the said lee-rails having feet or lower extensions $i^2$, with clips, each comprehending a front member $u$, having seating $u'$, a back and jointed member $t$, screw pin $r$, and trunnion screw box $s$, substantially as described.

8. In a connection attachment for the lee-rails of ship's berths, the combination with the triple members $b'$ $b^2$, $b^3$, of a depending face plate $i^2$, having lower part $i^3$, piercing $i^4$ and seat $i^5$; a screw pin comprehending shank $r^3$, collar $r^4$, and stem $r^5$; trunnion screw box $s$, having trunnion ends $s^2$, front member $u$, having seat $u'$, back and jointed member $t$, having bearing $t'$, and jointed end $t^2$ all combined, arranged, and acting, substantially as described.

In testimony that I claim the foregoing I have hereunto set my hand this 2d day of November, 1892.

WILLIAM PARISH HOSKINS.

Witnesses:
HENRY SKERRETT,
ARTHUR T. SADLER.